Dec. 1, 1964  C. F. DE PRISCO ETAL  3,158,928
METHOD AND MEANS FOR OPERATING A GENERATING MEANS
COUPLED THROUGH A TRANSDUCER TO A VIBRATORY
ENERGY WORK PERFORMING DEVICE
Filed March 30, 1962                    2 Sheets-Sheet 1

INVENTORS
CARMINE F. De PRISCO
WILLIAM M. BARFIELD
BY
Arthur H. Seidel
ATTORNEY

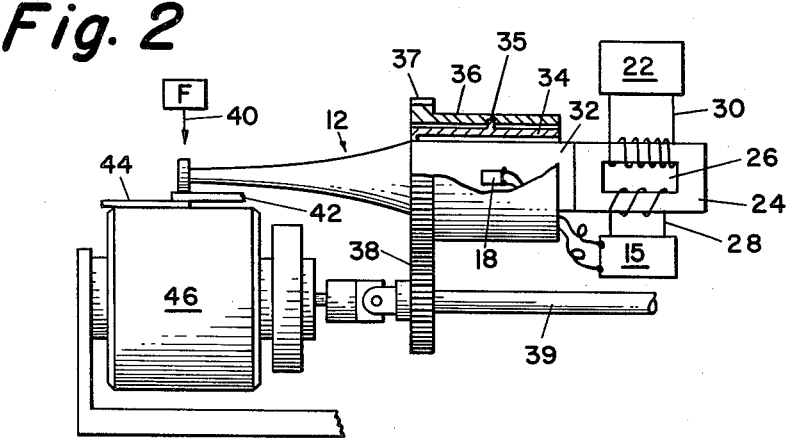
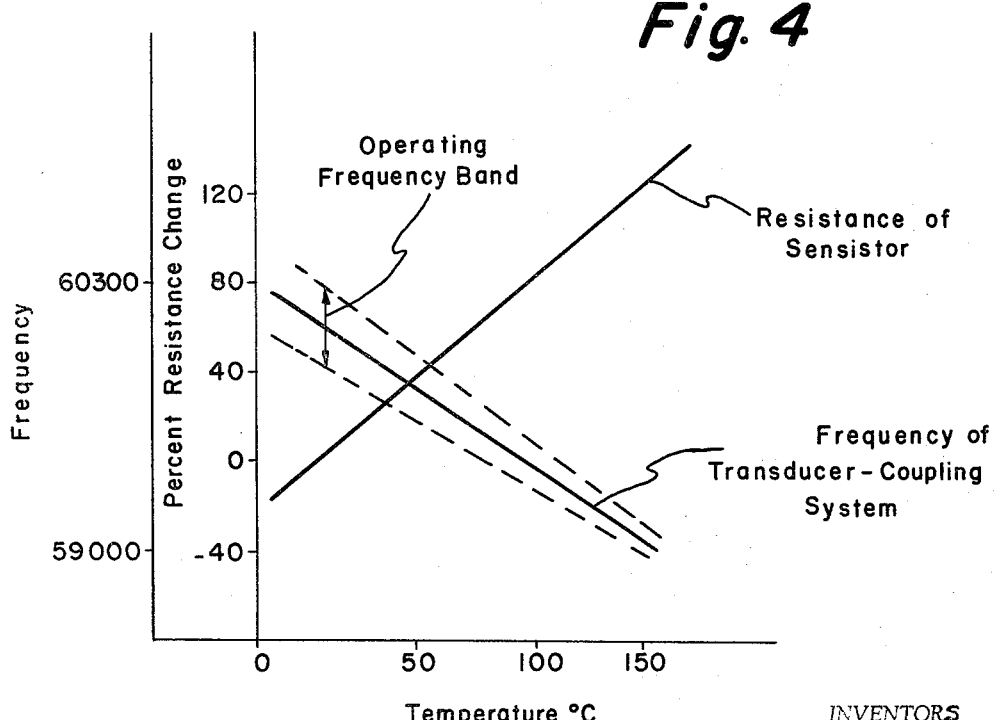

United States Patent Office

3,158,928
Patented Dec. 1, 1964

3,158,928
METHOD AND MEANS FOR OPERATING A GENERATING MEANS COUPLED THROUGH A TRANSDUCER TO A VIBRATORY ENERGY WORK PERFORMING DEVICE
Carmine F. De Prisco, Glen Mills, Pa., and William M. Barfield, Wilmington, Del., assignors to Aeroprojects Incorporated, West Chester, Pa., a corporation of Pennsylvania
Filed Mar. 30, 1962, Ser. No. 183,811
21 Claims. (Cl. 29—470.1)

This invention relates to an apparatus and method for controlling electro-mechanical devices. More particularly, the present invention relates to an apparatus and a method for automatically maintaining the preset or optimum operating frequency of an ultrasonic work-performing device so as to effect maximum power delivery under operating conditions.

In accordance with the present invention, means are provided for automatically adjusting the frequency of a power source to correct for frequency variations caused by temperature changes in a transducer-coupling system during either continuous or intermittent operation. It has been discovered that such control may be achieved by utilizing a thermal sensing element. The thermal sensing element is positioned in the transducer-coupling system of the ultrasonic device so as to detect thermal changes therein. The physical properties of the thermal sensing element are such that its resistance will alter with temperature, and this will affect the operation (and thereby the frequency) of an oscillator circuit in the power source, which in turn will act to maintain the frequency of the transducer-coupling system at its preset or optimum operating frequency under operating conditions.

It is well known in the art that ultrasonic devices operate most efficiently, that is with minimum power losses, when they operate at or near their resonant frequency. Also, it is well known that the resonant frequency of a transducer-coupling system of an ultrasonic device is sensitive to several factors, especially operating temperature changes.

Cooling devices are often used to minimize the effect of temperature change on resonant frequency. Various other means have been proposed heretofore to stabilize the frequency of an electro-mechanical device during its operating phases. Most of these devices involve the use of complex electrical circuits and/or are bulky and expensive. In general, also, such devices as proposed heretofore are most suitable for continuous operation and are not very practical for pulse-type operation wherein sudden demands are made on the system.

The present invention overcomes the disadvantages of the devices proposed heretofore by controlling the supply frequency in response to temperature changes in the transducer-coupling system. The present invention may be utilized with any one of a variety of types of transducer-coupling systems because only temperature changes are sensed as compared with prior devices which sense changes in electrical voltage and/or current.

It is an object of the present invention to provide a system for automatically sensing changes in the temperature of an energy transmitting device and for correspondingly changing the frequency of the alternating current power supply to a transducer portion of said device.

It is another object of the present invention to provide a novel control system for an electro-mechanical device by providing means for sensing temperature changes in said device and compensating for such temperature changes so as to maintain the acoustical power output of said device constant.

It is still another object of this invention to provide an automatic frequency control system for an energy transmitting device which is capable of being used on either a pulse-power basis or a continuous-duty basis.

It is still another object of this invention to provide a novel automatic control system which senses temperature excursions of an electro-mechanical device from a desired operating condition and automatically alters the supply frequency of said device to compensate for such excursions.

It is still another object of this invention to provide an automatic control system which lessens the cooling problem in connection with maintaining suitable operation of an electro-mechanical device.

It is a further object of the present invention to provide an automatic control system which is simple to assemble, inexpensive, compact, easy to maintain, and effective in automatically maintaining optimum operation of an ultrasonic transducer-coupling system.

It is a further object of the present invention to provide means for automatically adjusting the frequency of a power source to match changes in the frequency of a system which are caused by temperature changes in the system during steady or intermittent operation.

It is a still further object of the present invention to provide a novel method for maintaining a preset or optimum operating frequency of a vibratory energy transmitting device in spite of temperature changes of said device and by utilization of such temperature changes.

It is a still further object of the present invention to provide an automatic control system to maintain optimum welding conditions in production use of vibratory welding equipment under pulse or continuous duty conditions.

Other objects will appear hereinafter.

For the purpose of illustrating the invention there is shown in the drawings a form which is presently preferred; it being understood, however, that this invention is not limited to the precise arrangements and instrumentalities shown.

FIGURE 2 is a side elevation view of a typical example of a transducer-coupling system which may be controlled in accordance with the present invention.

FIGURE 4 is a graph of frequency and percent resistance change versus temperature.

Referring to the drawings in detail, wherein like numerals indicate like elements, there is shown in FIGURE 1 an automatic thermal feedback frequency control system designated generally as 10.

Figure 1:
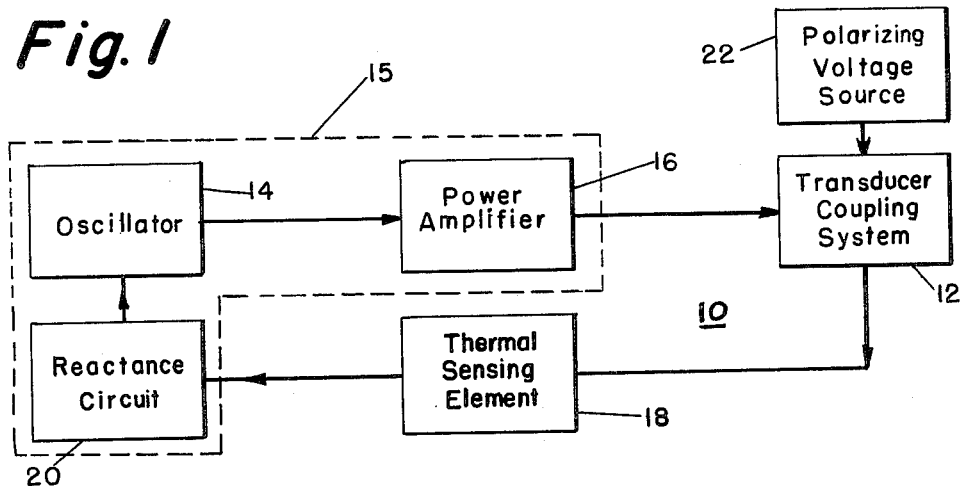
FIGURE 1 is a typical block diagram of the apparatus of the present invention.

The system 10 includes a transducer-coupling system 12 which is connected to an A.C. source 15 comprising power amplifier 16, reactance circuit 20, and oscillator circuit 14. A thermal sensing element 18 is coupled to a portion of a transducer-coupling system 12 as will be made clear hereinafter. The thermal sensing element 18 is coupled to the reactance circuit 20 which in turn is coupled to the oscillator circuit 14. A D.C. bias is applied to the transducer 24 of the transducer-coupling system 12 from polarizing voltage source 22. It should be noted that the polarizing voltage source 22 is utilized only with magnetostrictive transducers. When any other type of transducer is utilized, the polarizing voltage source 22 is generally not needed.

As shown more clearly in FIGURE 2, the frequency control system 10 of the present invention may be utilized in conjunction with an ultrasonic welding device of which the transducer-coupling system 12 is an integral part. Thus, the transducer-coupling system 12 may include a transducer 24 having a rectangular slot 26 therein. A coil 28 is wound through the slot 26 and is coupled to the A.C. source 15. A coil 30 is wound through the slot 26 and is coupled to the polarizing voltage source 22.

The transducer 24 may be any one of a wide variety of commercially available transducers. A specific embodiment of the transducer 24 is a stack of laminations of magnetostrictive metal, such as nickel or well known alloys such as nickel-cobalt, iron-cobalt-vanadium, iron-aluminum, etc., properly dimensioned to insure axial resonance with the frequency of the alternating current applied thereto, so as to cause it to increase or decrease in length according to its coefficient of magnetostriction. In place of the aforesaid metallic magnetostrictive materials, the transducer 24 may comprise an electrostrictive ceramic such as barium titanate, lead zirconate titanate, etc. The transducer-coupling system 12 may have a resonant frequency in the so-called ultrasonic range, such as a frequency of 60,000 cycles per second, all of its vibrating parts being dimensioned accordingly.

A coupler 32 is axially connected to transducer 24 by a metallurgical joint. The coupler 32 includes a tapered portion whose taper is an exponential function of the length and satisfies the relation:

$$S = S_0 e^{-2Tl}$$

where S is the original area, $S_0$ is the reduced area, T is a constant for the taper, and $l$ is the length of the tapered section. (See page 163, Piezoelectric Crystals and Ultrasonics, by Warren P. Mason, published in 1950 by Van Nostrand and Company.) The total length of the coupler 32 should be an integral number of one-half wavelengths in the material and geometry used at the transducer's resonant frequency, so that the joint between the transducer 24 and the coupler 32 will occur at a loop (antinode) of the wave motion and will not be appreciably stressed.

The coupler 32 is preferably supported by a force-insensitive Elmore mount 34. The mount 34 has one end metallurgically bonded to the coupler 32. The other end of the mount 34 is free from attachment. The mount 34 has a radial flange 35 at a node. The details of the structure and function of mount 34 are well known to those skilled in the art and are set forth in detail in Patents 2,891,178; 2,891,179; and 2,891,180.

A sleeve 36 is fixedly secured to the flange 35 and terminates in a gear 37. The gear 37 is in meshing engagement with gear 38 on drive shaft 39. The shaft 39 is coupled to a rotatably supported non-compliant anvil 46. Sheet members, such as metal members 42 and 44 are supported in intimate contact by anvil 46 at the intended weld zone. Means designated generally as F are provided to apply a clamping force in the direction of arrow 40 to bias the welding tip into forceful engagement with the member 42 at the intended weld zone. The welding tip may be of the type disclosed in Patent 2,946,120.

As shaft 39 rotates, the transducer-coupling system 12 and the anvil 46 will rotate in opposite directions. Hence, the members 42 and 44 may be welded together by a non-fusion seam weld. It will be appreciated that the illustration in FIGURE 2 is diagrammatic since conventional elements such as slip rings have not been illustrated. It will be obvious that only one of the anvil 46 and transducer-coupling system 12 need be positively rotated while the other is only rotatably supported.

The process by which sheets 42 and 44 are ultrasonically welded together and the amount of force exerted in the direction of arrow 40 are set forth in U.S. Patents 2,946,119 and 2,946,120 and therefore need not be described in detail. While the present invention is being illustrated in conjunction with a system designed to effect an ultrasonic weld between metal members, it will be appreciated by those skilled in the art that the present invention may be applied to other devices wherein it is desirable to maintain the preset or optimum operating frequency of the device. It will be appreciated that the present invention may also be utilized in conjunction with ultrasonic drills, ultrasonic soldering irons, ultrasonic cleaning units, and also with other systems relating operability and temperature change.

The thermal sensing element 18 is preferably one having a high temperature coefficient of resistance (either positive or negative, but preferably positive), low hysteresis (accurate retracing of resistance with rising and falling temperature), and consistent quality of manufacture. We have found that a commercially available thermal sensing element sold as Sensistor performs satisfactorily. The Sensistor thermal sensing element is a resistor made of high purity silicon with boron impurities added. The Sensistor has a high positive temperature coefficient of resistance of approximately 0.7–0.8% per degree centigrade, rapid response, and low hysteresis. When a 1000 ohm Sensistor was utilized, the slopes of resistance versus temperature were plotted and these curves proved to be reasonably linear with a positive slope of 610/75 or approximately 8 ohms change per degree centigrade rise in temperature. However, the Sensistor loses much of its linearity above 200° C.

The thermal sensing element 18 is preferably imbedded in the coupler 32. Alternatively, the thermal sensing element 18 may be taped or glued to the exterior surface of the coupler 32. The location of the thermal sensing element 18 is not critical except that, in general, its location should be such as to obtain the desired response characteristics, since the response is a function of its location with respect to the source of heat. As shown in FIGURE 2, the thermal sensing element 18 will have an approximately average response, as it is located so as to sense the general temperature changes of the system. Closer than this to the source of heat (such as the transducer or the work area), it will respond quickly, perhaps quickly enough to undesirably anticipate changes, while farther away its response may lag somewhat.

Figure 3:
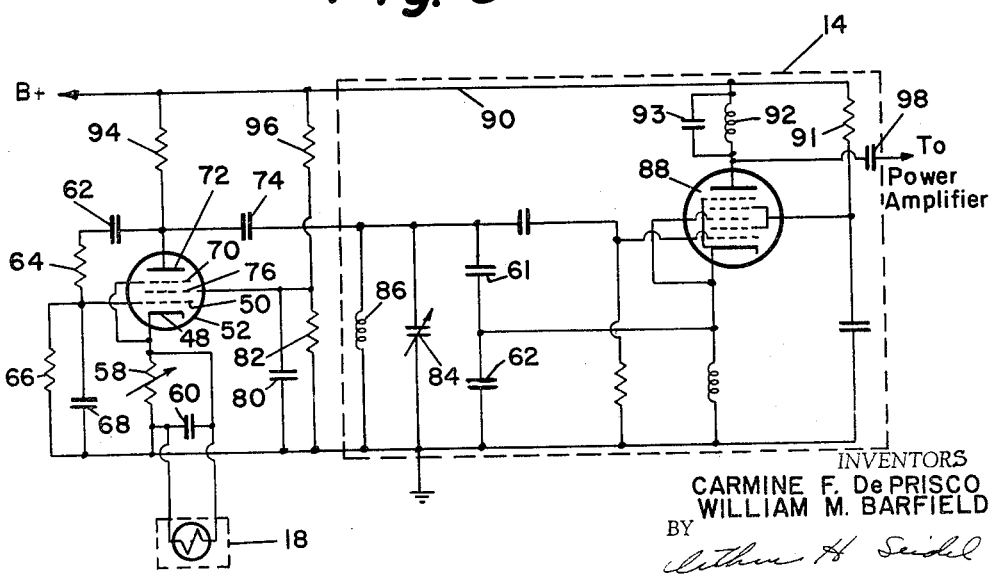
FIGURE 3 is a circuit diagram for the reactance tube circuit and oscillator circuit illustrated in the block diagram of FIGURE 1.

In FIGURE 3, there is shown a reactance tube 52 (such as a 6660 tube) having a plate 72, suppressor grid 70, screen grid 76, control grid 50 and cathode 48. The cathode 48 is connected to the suppressor grid 70 and through a parallel resistor 58 capacitor 60 network to ground. This network is designed to provide a bias voltage for the cathode. The sensing element 18 is also connected across the resistor 58, capacitor 60 network and is designed to change the cathode bias and thus the voltage between control grid and cathode.

The control grid 50 is connected as in a standard pentode reactance tube arrangement. The R-C circuit including resistor 64 and capacitor 68 effect a 90 degree phase shift in the voltage between the plate 72 and grid 50 of tube 52. This latter R-C circuit makes the output across the plate 72 and ground appear to be an inductance in parallel with a resistance. This inductance is raised by increases in the bias voltage, or increases in the resistance of the Sensistor 18. B+ voltage is applied to the plate 72 of the pentode 52 through a resistor 94 and to the screen grid 76 through a resistor 96. A capacitor 80 shunts any A.C. screen grid 76 voltage to ground and a resistor 82 helps maintain the D.C. voltage on the screen grid 76 positive with respect to the cathode 48.

The reactance tube circuit 20 is A.C. coupled through capacitor 74 to a pentagrid Colpitts oscillator circuit 14. The oscillator consists of a pentagrid tube 88 whose cathode is connected between two capacitors 61 and 62 having end terminals connected across a tank coil 86 and ground. The end terminal of capacitor 61 is also connected through a coupling capacitor to the control grid of the tube 88. An adjustable capacitor 84 is also connected across the tank coil 86 to manually vary the frequency of the oscillator. The parallel L-C network including inductance 92 and capacitor 93 is designed to give a good output wave form at the design frequency. The plate is also connected through a capacitor 98 to the power amplifier 16.

Increases in the resistance of Sensistor 18 cause increases in the inductance reflected at the output terminals of the reactance tube 52 and therefore raise the effective inductance of the parallel circuit including the tank coil 86 and the tube 52. In raising the inductance of the parallel circuit it lowers the frequency of the oscillator 14.

The operation of the control system 10 is as follows:

The transducer-coupling system 12 is operated at its optimum frequency with a designated clamping force being applied to the sheets of metal 42 and 44. Then ultrasonic spot welding or seam welding may be conducted at various input powers, time and repetition rates. As the duty cycle of the transducer-coupling system 12 increases, the temperature thereof is raised and the frequency of sound therein is lowered. Hence, the frequency of the transducer-coupling system 12 decreases as illustrated in FIGURE 4.

The temperature changes are sensed by the thermal sensing element 18. The change in the temperature of the thermal sensing element 18 varies the cathode 48 bias applied to the tube 52. For example, an increase in the temperature of the transducer-coupling system 12 increases the resistance in sensing element 18 which in turn increases the cathode 48 bias in tube 52 thereby effecting an increase in reflected inductance across the oscillator tank circuit with a subsequent lowering of the frequency of the oscillator tube 88.

The subsequent lowering of the frequency of the oscillator tube 88 reduces the frequency of the power source supply to the transducer 24 so that optimum operating frequency may be maintained. Only temperature is sensed by element 18 so that any type of transducer may be utilized in the transducer-coupling system 12.

While the circuit illustrated in FIGURE 3 is suitable for use in accordance with the present invention, it will be obvious to those skilled in the art that other equivalent circuits may be substituted therefor.

While the present invention has been described in connection with a Sensistor as the preferred type of thermal sensing element, it will be appreciated that other types of thermal sensing elements having the appropriate characteristics outlined above may be utilized, with appropriate circuitry modifications which are within the skill of the art. However, the Sensistor is eminently preferable for purposes of the present invention to such thermal sensing elements as thermocouples, thermistors, etc. A thermocouple has very little signal and would require, for example, the use of amplifiers and proper phase reversal. A thermistor would require a phase inverting stage and is itself subject to internal heating and therefore resistance changes, as well as having relatively high hysteresis and a negative temperature coefficient of resistance.

For most effective adjustment of the automatic control system, the frequency spread or band width within which good welding is possible with a given system should be narrowed as much as possible. The difference between the mechanical vibration frequency of the transducer-coupling system and the electrical frequency of the power source represents the "tracking error." This error may be reduced by adjustment of resistor 58. Increasing the resistance of resistor 58 will increase the amount of frequency correction feedback by the thermal sensing element 18. Decreasing the resistance of resistor 58 will decrease the amount of frequency correction feedback by the thermal sensing element 18. The amount of tracking error should be less than the welding band spread for best results.

Thus, it will be seen that the present invention accomplishes the objects set forth above. The automatic thermal feedback control system of the present invention automatically maintains the optimum system operating frequency in response to temperature changes at any convenient location on the transducer-coupling system.

Frequency stability may be an unimportant or an important matter according to the application. The present invention has particular utility in conjunction with relatively small units (such as 40 to 60 kc.) of the general type of FIGURE 2 of this application and FIGURE 8 of U.S. Patent 2,946,119 and the figures of U.S. Patent 2,946,120. Such smaller units are usually more subject to heating and frequency instability than relatively large units (such as 15 kc. welders of the reed-mass-wedge type). This is because their small size makes it difficult to dissipate any great amount of heat energy which may be generated and to incorporate adequate cooling devices.

While the present invention has been described principally in connection with vibratory welders which do not involve work with molten metals but only with solid state metals, it will be appreciated that this invention has particular utility with systems such as ultrasonic soldering irons, ultrasonic brazing units, and other ultrasonic units required to do work on molten or heated materials. In these applications, the heat at the work area provides an additional burden on the vibratory system which can drastically affect the frequency stability and therefore the efficiency of the system. The present invention, in such applications, can minimize power losses in the vibratory system and also enable greater reproducibility of results in the work area.

The present invention may be embodied in other specific forms without departing from the spirit or other essential attributes thereof and, accordingly, reference should be made to the appended claims, rather than to the foregoing specification as indicating the scope of the invention.

We claim:

1. A non-fusion method for welding members together comprising the steps of placing to-be-welded faces of the members together, applying a force to the members in a direction and of a magnitude to hold the contacting to-be-welded faces of the members in intimate contact at the intended weld zone and to couple mechanical vibratory energy into said zone, introducing through a vibrating element contacting one of the to-be-welded members adjacent the weld zone mechanical vibration having a frequency of between about 59 and 300,000 cycles per second, said mechanical vibration comprising a vibration component in a direction substantially perpendicular to the direction of applied force and of an energy level sufficient to weld the members to each other, performing the above steps for a sufficient period of time so that the temperature of said vibrating element changes, sensing temperature changes of the vibrating element, and varying the frequency of the source of said mechanical vibration so that the frequency of the source conforms to the frequency of said element in response to the sensed temperature changes.

2. A method in accordance with claim 1 wherein said mechanical vibration is a continuous wave vibration having a frequency of between about 400 and 75,000 cycles per second.

3. A method in accordance with claim 1 wherein said step of sensing temperature changes includes using a thermal sensing element whose resistance varies with temperature.

4. A method in accordance with claim 3 wherein said step of varying the frequency of said source is accomplished electronically in response to the resistance of said thermal sensing element.

5. A method in accordance with claim 1 wherein said step of sensing temperature changes includes sensing increases in temperature, and said step of varying the frequency of said source includes lowering the frequency of said source in response to sensed increases in temperature of said vibrating element.

6. Apparatus for non-fusion welding contacting members together comprising a force-applying member, means for impelling a tip portion of said force-applying member against an outer face of one of said contacting members with a force in a direction and of a magnitude to hold the to-be-welded faces of the members in intimate contact at the intended weld zone and to couple mechanical vibratory energy into the intended weld zone, generator means for vibrating said tip portion of said force-applying member at a frequency of between about 59 and 300,000 cycles per second in a path substantially perpendicular to the direction of applied force while such to-be-welded faces of the members are being held in intimate contact by engagement with said tip portion of said force-applying member, with said vibrating means furnishing sufficient power so that the mechanical vibration delivered by said tip portion in said path is at a sufficient energy level to weld the members together, means for sensing temperature change in said force-applying member and means for varying the frequency of said generator means to match the frequency of said member in response to such sensed temperature change.

7. Apparatus in accordance with claim 6 wherein said means for sensing temperature changes includes a thermal sensing element whose resistance varies with temperature, said thermal sensing element being in abutting contact with said force-applying member.

8. Apparatus in accordance with claim 7 wherein said last mentioned means includes an electronic circuit coupled to said thermal sensing element, said electronic circuit including components for reducing the frequency of said generator means in response to increases in temperature sensed by said thermal sensing element.

9. Apparatus comprising a transducer, a coupler whose temperature increases when transmitting energy to perform useful work, said coupler being fixedly secured to said transducer, a generating means coupled to said transducer, means for sensing temperature changes in said coupler, and means coupled to said sensing means for maintaining the frequency of said generating means substantially at the operating frequency of said transducer in response to temperature changes in said coupler.

10. Apparatus in accordance with claim 9 wherein said sensing means includes a thermal sensing element fixedly secured to said coupler approximately equidistant from the ends of said coupler.

11. Apparatus in accordance with claim 9 wherein said sensing means includes a thermal sensing element fixedly secured to said coupler, said maintaining means including an electronic circuit coupled to said element and coupled to an oscillator circuit in said generating means.

12. A method of automatically coordinating the respective operating frequencies of a power source for a vibration-producing transducer and an acoustical system incorporating such a transducer to perform useful work comprising the steps of sensing the temperature in at least one locale within said acoustic system during operation of the system, and altering the frequency of said power source in relation to the temperatures obtained by said sensing step to conform the frequency of said power source to the frequency of said system.

13. A method of optimizing the performance of a useful work performing apparatus incorporating an acoustic system having a vibration-producing transducer with a frequency-temperature characteristic and a power source for said transducer having a regulatable frequency output comprising the steps of monitoring the temperature of said acoustic system in at least one location during operation of said system, and maintaining during said operation and as a result of said monitoring an inverse relationship between change in the output frequency of said power source and change in the temperature of said system so that the frequency of said power source is substantially matched to the changed frequency of said system.

14. In a method of operating a generating means coupled to a transducer so that the transducer is excited by said means and said transducer being connected to a coupler member adapted to perform useful work, the steps of performing useful work by delivering vibratory energy from said coupler member for a sufficient period of time so that the temperature of said coupler member changes, sensing temperature changes in said coupler member, and controlling the frequency of said generating means in response to the sensed temperature changes so as to maintain the frequency of said generating means within a predetermined range closely centered around the operating frequency of said coupler member at its changed temperature.

15. In a method of operating a generating means coupled to a transducer so that the transducer is excited by said means and with said transducer being coupled to a coupler member adapted to transmit vibratory energy for the performance of useful work, the steps of transmitting vibratory energy by said coupler member, generating the signal indicative of a change in the operating frequency of said coupler member due to temperature change in said coupler member, and varying the frequency of said generating means in response to said signal so that the frequency of said generating means is substantially matched to the changed frequency of said coupler member.

16. In a method of operating a generating means coupled to a transducer portion of a transducer-coupling system transmitting energy for the performance of useful work comprising the steps of sensing the temperature in at least one locale within said system, and adjusting the frequency output of said generating means in response to the sensed temperature so that the frequency output of said generating means will coincide with the operating frequency of said transducer.

17. Apparatus comprising a transducer-coupling system, a generating means coupled to the transducer of said system, said system having an energy transmitting portion from which energy may be delivered to perform useful work, and means coupled to said generating means and system for sensing temperature changes in said system during operation thereof, and means for maintaining the frequency output of said generating means at the operating frequency of said system in response to temperature changes sensed in said system.

18. Apparatus in accordance with claim 17 wherein said sensing means includes a thermal sensing element having a high positive temperature coefficient of resistance and a low hysteresis as well as having a rapid response.

19. Apparatus in accordance with claim 17 wherein said system includes a coupler coupled to said transducer, said frequency sensing means including a thermal sensing element secured to said coupler, said frequency maintaining means including electronic circuitry, said thermal sensing element being coupled to said circuitry for varying the frequency thereof in response to sensed temperature changes of said coupler.

20. In an apparatus comprising a power source for powering the transducer portion of an acoustical system having at least one vibration-producing transducer and at least one acoustical coupling member which are constructed to vibrate substantially at a given frequency of vibration, the combination therewith of a feedback circuit to control the frequency output of said power source, said circuit being responsive to temperature variations in said acoustical system during operation thereof in the performance of useful work, said circuit comprising a thermal sensing element coupled to a portion of said system, said element sensing the temperature of said portion during operation of said system, and means coupling said element to said power source so that changes detected by said element are reflected to said source, whereby a frequency output of said source is altered to conform to the actual temperature-varied operating frequency of said system during operation of said system.

21. Apparatus comprising a transducer, a coupler whose temperature increases when transmitting energy to perform useful work, said coupler being fixedly secured to said transducer, an electronic oscillator for generating alternating current, said electronic oscillator including a reactance-capacitance tank circuit, an electronic power amplifier for amplifying the alternating current generated by said electronic oscillator and for coupling said oscillator to said transducer, a thermal sensing element fixedly secured to said coupler, said thermal sensing element having the characteristic that its electrical resistance will vary with the changes in temperature, an electronic reactance circuit connected to said thermal sensing element and connected to said oscillator tank circuit, said reactance circuit being adapted to vary the reactance of said oscillator tank circuit in proportion to variations in the resistance of said thermal sensing element, whereby the frequency of the alternating current generated by said oscillator is maintained at the optimum operating frequency of said coupler.

References Cited in the file of this patent

UNITED STATES PATENTS

| | | |
|---|---|---|
| 2,470,738 | Bach | May 17, 1949 |
| 2,471,143 | Cress | May 24, 1949 |
| 3,002,270 | De Prisco | Oct. 3, 1961 |
| 3,056,192 | Jones | Oct. 2, 1962 |